United States Patent
Malladi et al.

(10) Patent No.: US 11,138,135 B2
(45) Date of Patent: Oct. 5, 2021

(54) SCALE-OUT HIGH BANDWIDTH MEMORY SYSTEM

(71) Applicant: Samsung Electronics Co., Ltd., Suwon-si (KR)

(72) Inventors: Krishna T. Malladi, San Jose, CA (US); Hongzhong Zheng, Los Gatos, CA (US); Dimin Niu, Sunnyvale, CA (US); Peng Gu, Santa Barbara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/194,219

(22) Filed: Nov. 16, 2018

(65) Prior Publication Data

US 2020/0097417 A1 Mar. 26, 2020

Related U.S. Application Data

(60) Provisional application No. 62/733,965, filed on Sep. 20, 2018.

(51) Int. Cl.
| | |
|---|---|
| *G06F 13/16* | (2006.01) |
| *G06F 9/30* | (2018.01) |
| *G06F 7/544* | (2006.01) |

(52) U.S. Cl.
CPC ........ *G06F 13/1652* (2013.01); *G06F 7/5443* (2013.01); *G06F 9/30014* (2013.01); *G06F 9/30036* (2013.01); *G06F 13/1694* (2013.01)

(58) Field of Classification Search
None
See application file for complete search history.

(56) References Cited

U.S. PATENT DOCUMENTS

| | | | | |
|---|---|---|---|---|
| 2005/0021874 | A1* | 1/2005 | Georgiou | H04L 49/602 709/250 |
| 2012/0290793 | A1* | 11/2012 | Chung | G06F 12/0897 711/119 |
| 2015/0046675 | A1* | 2/2015 | Barry | G06F 13/28 712/7 |
| 2015/0363225 | A1* | 12/2015 | Cher | G06F 9/4818 718/108 |
| 2017/0185379 | A1* | 6/2017 | Anderson | G06F 7/4876 |
| 2017/0316312 | A1 | 11/2017 | Goyal et al. | |
| 2018/0032859 | A1 | 2/2018 | Park et al. | |
| 2018/0189638 | A1 | 7/2018 | Nurvitadhi et al. | |
| 2018/0300265 | A1* | 10/2018 | Roberts | G11C 5/06 |
| 2019/0042538 | A1* | 2/2019 | Koren | G06N 3/04 |
| 2019/0325297 | A1* | 10/2019 | Fowers | G06N 3/063 |

FOREIGN PATENT DOCUMENTS

| | | |
|---|---|---|
| CN | 106126481 A | 11/2016 |
| CN | 108241484 A | 7/2018 |
| CN | 108256643 A | 7/2018 |

\* cited by examiner

*Primary Examiner* — Charles J Choi
(74) *Attorney, Agent, or Firm* — Lewis Roca Rothgerber Christie LLP (57) ABSTRACT

A high bandwidth memory (HBM) system includes a first HBM+ card. The first HBM+ card includes a plurality of HBM+ cubes. Each HBM+ cube has a logic die and a memory die. The first HBM+ card also includes a HBM+ card controller coupled to each of the plurality of HBM+ cubes and configured to interface with a host, a pin connection configured to connect to the host, and a fabric connection configured to connect to at least one HBM+ card.

19 Claims, 8 Drawing Sheets

SCALE-OUT HIGH BANDWIDTH MEMORY SYSTEM

CROSS-REFERENCE TO RELATED APPLICATION(S)

This patent application claims the benefit of U.S. Provisional Patent Application Ser. No. 62/733,965, filed on Sep. 20, 2018 and entitled "SCALE-OUT HIGH BANDWIDTH MEMORY SYSTEM," the entire content of which is hereby expressly incorporated by reference.

BACKGROUND

For years the storage industry has been attempting to move computational functionality closer to storage. In-storage compute has the advantage of reducing the bandwidth consumed on various data buses (e.g., the PCIe bus) caused by the movement of data between storage and processing. As memory sizes have increased, traffic on the various buses has becoming increasingly congested. Bus bandwidth bottlenecks can sometimes lead to severe performance degradation. Thus, in-storage compute has become increasingly important and as a result of the increased capability for in-storage compute, the number of in-memory engines has been growing. For example, nearly any application that stores large datasets in DRAM can benefit from using in-storage compute to prevent bus bottlenecks. Database and data processing applications such as Impala and Spark now include in-storage compute functionality and many deep learning applications are also utilizing in-storage compute.

The use of artificial intelligence (AI) has increased dramatically over the last few years. AI has become commonly used in domains such as image classification, speech recognition, media analytics, heath care, autonomous machines, smart assistants, etc. Using AI often necessitates the use of large datasets (e.g., from databases, sensors, images etc.) and the use of advanced algorithms that similarly necessitate high performance computing with teraflops of computational power. To facilitate the use of high performance computing, high bandwidth memory has been introduced to provide high bandwidth for parallel accelerators.

Current high bandwidth memory (HBM) provides memory with a high bandwidth connection (e.g., up to about 1 TB/s). Typical HBMs include 4 to 8 DRAM stacks per host ASIC, GPU, or FPGA and are generally twice as efficient as GDDR5 RAM.

Many GPU-based systems use multiple GPUs to expand memory capacity and bandwidth in order to run deep neural network applications having large batch sizes. Today's GPU/ASIC systems are usually limited to 4 HBMs due to SOC PIN limitations and each HBM only has up to 8 DRAM stacks. Thus, a new HBM system is needed to facilitate larger memory and bandwidth capacities.

SUMMARY

Some embodiments of the present disclosure provide a system and method for a high bandwidth memory (HBM) system. In various embodiments, the HBM system includes a first HBM+ card. In various embodiments, the first HBM+ card includes a plurality of HBM+ cubes, wherein each HBM+ cube comprises a logic die and a memory die; a HBM+ card controller coupled to each of the plurality of HBM+ cubes and configured to interface with a host; a pin connection configured to connect to the host; and a fabric connection configured to connect to at least one HBM+ card.

In various embodiments, the logic die includes an accelerator logic configured to: receive instructions from the HBM+ card controller; input vectors to a vector engine; execute fused multiply-add floating point operations; and return an output to an accumulator.

In various embodiments, the logic die includes an accelerator having: a control engine; a buffer; an instruction decoder; and a general matrix multiply (GEMM) engine.

In various embodiments, the control engine is configured to operate as a routing controller, a high bandwidth memory controller, a direct memory access (DMA) engine, a power controller, a multiple model adaptive controller (MMAC) scheduler.

In various embodiments, the GEMM engine includes a dense multiple model adaptive controller (MMAC), a sparse MMAC, and a sparse-dense multiplexer configured to route sparse data to the sparse MMAC and route dense data to dense MMAC.

In various embodiments, the memory die includes at least one DRAM memory block.

In various embodiments, the logic die and the memory die are three-dimensionally stacked.

In various embodiments, each of the plurality of HBM+ cubes is configured to send and receive data to another HBM+ cube in the plurality HBM+ cubes using at least one of a buffer-based or peer-to-peer communication link.

In various embodiments, the HBM system includes a first HBM+ card and a second HBM+ card. In various embodiments, the first HBM+ card includes: a first plurality of HBM+ cubes, wherein each of the first HBM+ cubes has a logic die and a memory die; a first HBM+ card controller coupled to each of the first plurality of HBM+ cubes and configured to interface with a host; a first pin connection connected to the host; and a first fabric connection configured to connect to at least one HBM+ card. In various embodiments, the second HBM+ card includes: a second plurality of HBM+ cubes, wherein each of the second HBM+ cubes has a logic die and a memory die; a second HBM+ card controller coupled to each of the second plurality of HBM+ cubes and configured to interface with the host; a second pin connection configured to connect to the host; and a second fabric connection configured to connect to at least one HBM+ card.

In various embodiments, the first HBM+ card is connected to the second HBM+ card using the first fabric connection and the second fabric connection.

In various embodiments, the host is at least one of an application-specific integrated circuit (ASIC), a field-programmable gate array (FPGA), or a graphics processing unit (GPU).

In various embodiments, the HBM system further includes a third HBM+ card having a third pin connection configured to connect to the host and a third fabric connection configured to connect to at least one HBM+ card and a fourth HBM+ card having a fourth pin connection configured to connect to the host and a fourth fabric connection configured to connect to at least one HBM+ card.

In various embodiments, the first fabric connection is connected to the second fabric connection, the third fabric connection, and the fourth fabric connection; the second fabric connection is connected to the first fabric connection, the third fabric connection, and the fourth fabric connection; the third fabric connection is connected the first fabric connection, the second fabric connection, and the fourth fabric connection; and the fourth fabric connection is connected to the first fabric connection, the second fabric connection, and the third fabric connection.

In various embodiments, the second pin connection, the third pin connection, and the forth pin connection are each connected to the host.

In various embodiments, the HBM system further includes a fifth HBM+ card having a fifth pin connection not connected to the host and a fifth fabric connection connected to at least one of the first fabric connection, the second fabric connection, the third fabric connection, or the forth fabric connection.

In various embodiments, a HBM system includes a first HBM+ card. In various embodiments, the first HBM+ card includes a plurality of HBM+ cubes, wherein each HBM+ cube wherein each of the plurality of HBM+ cubes is configured to send and receive data to another HBM+ cube in the plurality HBM+ cubes using at least one of a buffer-based or peer-to-peer communication link and each HBM+ cube has a memory and an accelerator. In various embodiments, the accelerator includes: a control engine; an SRAM; an instruction decoder; and a general matrix multiply (GEMM) engine logic die and a memory die. In various embodiments, the first HBM+ card further includes: a HBM+ card controller coupled to each of the plurality of HBM+ cubes and configured to interface with a host; a pin connection configured to connect to the host; and a fabric connection configured to connect to at least one HBM+ card.

In various embodiments, the first HBM+ card is configured to operate in accordance with a HBM+ instruction set architecture to instantiate and execute operations on the accelerator and control a program flow and distribution between the plurality of HBM+ cubes.

In various embodiments, the control engine is configured to operate as a routing controller, a high bandwidth memory controller, a direct memory access (DMA) engine, a power controller, a multiple model adaptive controller (MMAC) scheduler.

In various embodiments, the GEMM engine includes a dense multiple model adaptive controller (MMAC), a sparse MMAC, and a sparse-dense multiplexer configured to route sparse data to the sparse MMAC and route dense data to dense MMAC.

In various embodiments, the memory and the accelerator are three-dimensionally stacked.

BRIEF DESCRIPTION OF THE DRAWINGS

Some embodiments can be understood in more detail from the following description taken in conjunction with the accompanying drawings, in which.

DETAILED DESCRIPTION

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Embodiments of the present disclosure include a system and method for a scale-out high bandwidth memory (HBM+) system. The scale-out HBM+ system includes an architecture that includes a plurality of HBM+ memory cubes that each include a logic die and memory die. The HBM+ system is able to utilize the HBM+ memory cubes to independently run parallel operations. In various embodiments, the architecture includes a plurality of HBM+ memory cubes that are grouped into clusters and multiple clusters may be on the same card. Each card may include a controller configured to distribute data and associated computational commands to the HBM+ cubes.

In various embodiments, the HBM+ system provides buffer-based communication between HBM+ memory cubes and in other embodiments provides peer-to-peer communication between HBM+ memory cubes. In various embodiments, the communication between HBM+ memory cubes may prioritize localizing parallel compute with maximum memory bandwidth. Furthermore, in various embodiments, a HBM+ system may include multiple cards that are linked together. The architectures allows for a significant increase the overall memory capacity by allowing for more memory per card and the bandwidth of the HBM+ system is increased due to the cards being linked resulting in large increases in application performance in deep learning training and inference, high performance computing, graphical computations, and other applications. By better facilitating processing in-memory, the HBM+ system has the ability to address the challenges of these applications by allowing for the scheduling of complex operations on DRAM logic dies to provide significantly higher compute abilities while lowering power consumption and overall total cost of ownership.

In various embodiments, the scale-out HBM+ system also includes a software framework for utilizing the systems advantages. The system architecture and software framework allow for the clustering of HBM+ systems into a scalable appliance to provide localized high bandwidth and high capacity to support special purpose high performance computation. For example, in various embodiments, the HBM+ system is configured to perform parallel mathematical operations including inputting vectors to a vector engine organized in a parallel manner, performing memory-centric fused multiply-add floating point operations within the HBM+ and returning output to an accumulator.

Figure 1:
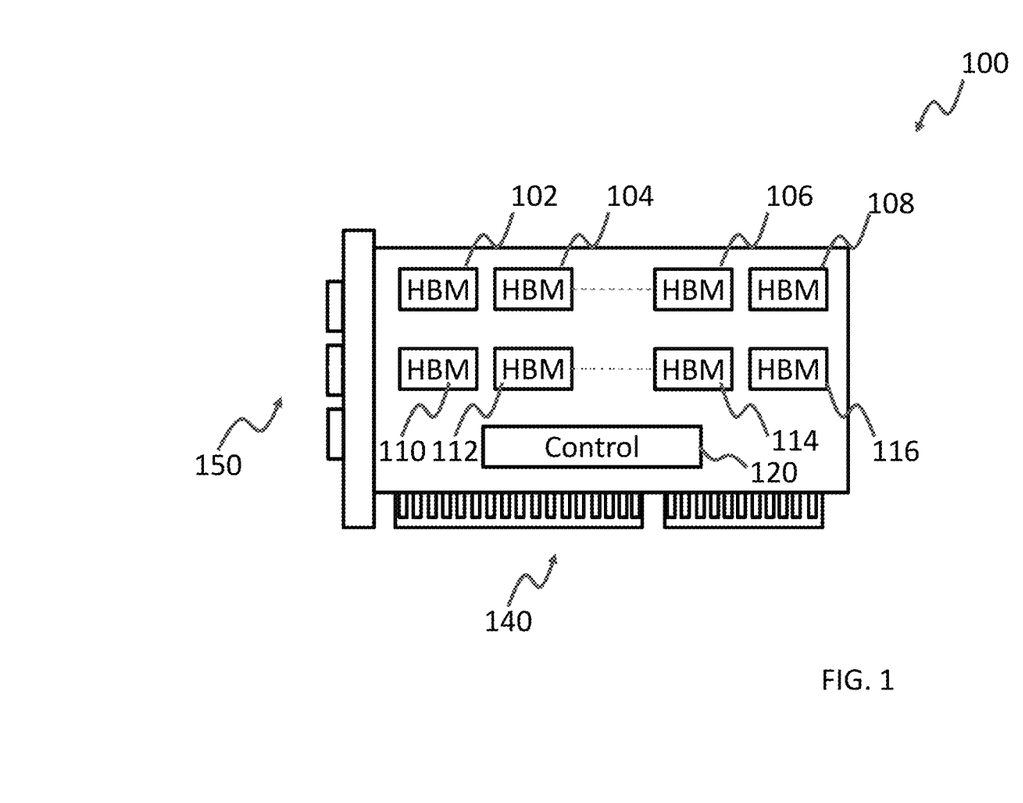
FIG. 1 depicts a HBM+ card according to various embodiments.

FIG. 1 depicts a HBM+ card according to various embodiments.

Referring to FIG. 1, in various embodiments a HBM+ card 100 includes a plurality of HBM+ cubes 102-116 and a controller 112. In various embodiments, each HBM+ card 100 may have up to 16 HBM+ cubes 102-116. Each HBM+ cube 102-116 includes both logic dies and memory dies. In various embodiments, the logic die may include logic for accelerating various functions (e.g., computational functions such as artificial intelligence functions). For example, a HBM+ cube 102-116 may have a microarchitecture that includes a control engine, an SRAM structure, an instruction decoder and a combination of dense and sparse specialized matrix multiplication units directly in the HBM+ logic die. For example, in various embodiments, the HBM+ system includes HBM+ cubes that are configured to identify input data patterns that are dense and identifies input data patterns that are sparse. Input data that is dense may be directed to a dense parallel engine and input data that is sparse may be directed to a sparse engine. In various embodiments, the logic may additionally include routing and memory controller functionality in the microarchitecture.

In various embodiments, the memory die may be configured for various types of volatile or non-volatile memory. For example, the memory die may include DRAM, SRAM, or any other type of suitable memory.

In various embodiments, a plurality of HBM+ cubes 102-116 may be coupled to a HBM+ card controller 120 that may, for example, be an ARM processor, a special purpose engine, an FPGA, or any other suitable processor/controller, while also providing a direct interface with a host CPU or GPU or FPGA. Although only eight HBM+ cubes 102-116 are depicted, it should be understood that any suitable number of HBM+ cubes may be included in a HBM+ card. For example, in some embodiments, a HBM+ card may include sixteen HBM+ cubes.

In various embodiments, the card 100 may include various connections for integration within the system. For example, in various embodiments, the HBM+ card 100 may be configured with a pin connection 140 for directly connecting to a host. In various embodiments, the pin connection 140 may be a PCIe or other type of standard connection. Furthermore, in various embodiments, may include a HBM+ fabric connector 150 for connecting to other HBM+ cards. For example, an HBM+ system may include special purpose interconnect fabrics to scale the system to include a plurality of cards. In the depicted embodiment, three fabric connectors are depicted, however, any suitable number of fabric connectors may be implemented.

Figure 2:
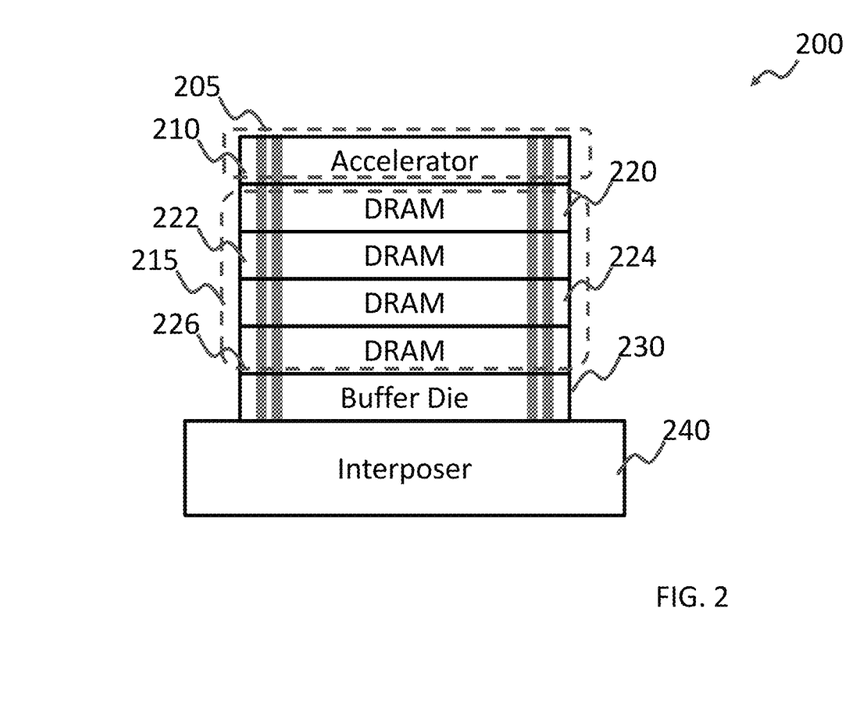
FIG. 2 depicts an HBM+ cube microarchitecture according to various embodiments.

FIG. 2 depicts a HBM+ cube microarchitecture according to various embodiments.

Referring to FIG. 2, in various embodiments, each HBM+ cube 200 has a microarchitecture featuring a logic die 205 connected to a memory die 215. In various embodiments, the memory die 215 and the logic die 205 may be stacked 3-dimensionally. In the depicted embodiment, the logic die 205 is shown on top of the memory die 215, however, in other embodiments, the memory die 215 may be placed on top of the logic die 205. Furthermore, multiple memory and logic dies may be utilized.

In various embodiments, the logic die 205 may include accelerator logic 210 and the memory die 215 may include a memory stack that includes DRAM 220-226. In various embodiments, the accelerator logic 210 may be layered on top of the stacked DRAM 220-226. Although shown as a single accelerator logic and four DRAM layers, it should be understood that any ratio or number of DRAM and accelerator logic layers may be utilized. Furthermore, any suitable high performance memory (including both static and dynamic memory) may be used.

In various embodiments, the HBM+ cube 200 may be positioned on an interposer 240 and may send and receive data and commands using connections to other components connected to the interposer 240. In various embodiments, a buffer layer 230 may be positioned between the DRAM 220-226 and the interposer 240.

Figure 3:
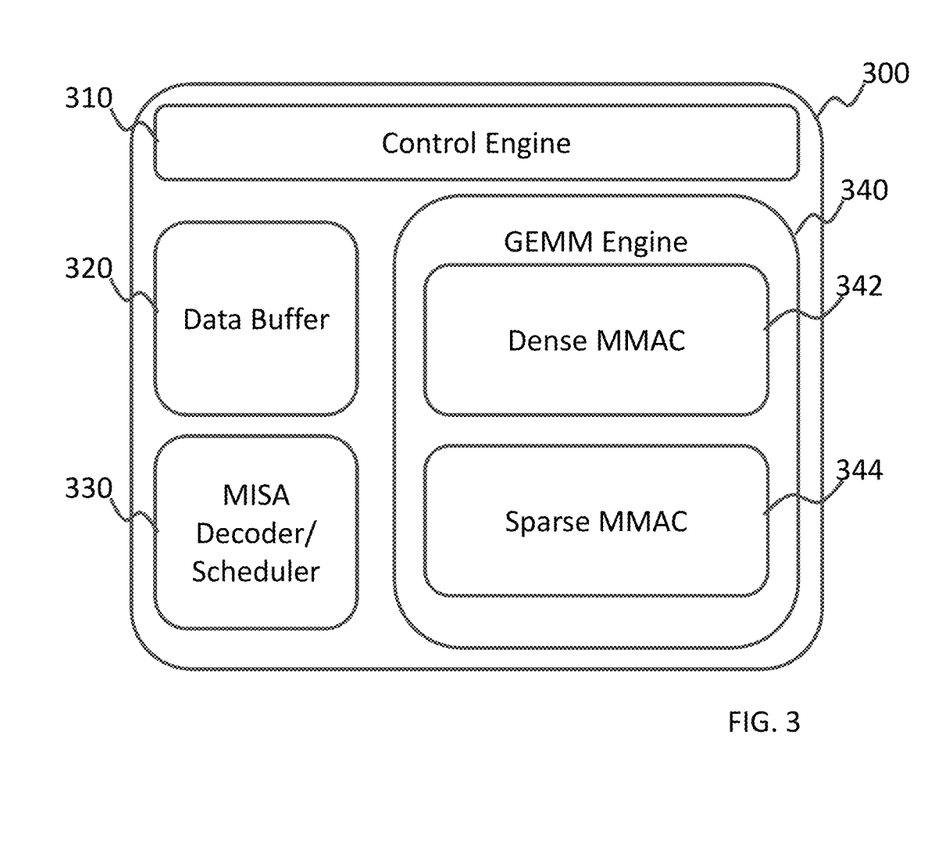
FIG. 3 depicts HBM+ accelerator logic according to various embodiments.

FIG. 3 depicts HBM+ accelerator logic according to various embodiments.

Referring to FIG. 3, in various embodiments, the accelerator logic 300 may be configured to perform various in-storage computations. For example, in various embodiments, the accelerator logic 300 is configured to receive instructions from the HBM+ card controller, input vectors to a vector engine, performing memory centric fused multiply-add floating point operations within HBM+ cube and returning output to an accumulator operating on the HBM+ card or on another HBM+ card. Thus, in various embodiments, the vectors may be input to vector engines in an organized and parallel manner.

In various embodiments, the accelerator logic 300 includes a control engine 310, a data buffer 320, an instruction decoder/scheduler 330, and a general matrix multiply (GEMM) engine 340.

In various embodiments, the control engine 310 may be configured to control a HBM+ cube's functions as well as interface with a card controller (e.g., the HBM+ card controller 120) or a host (e.g., a FPGA, GPU, ASIC or other suitable host). For example, the control engine may function as a routing controller, a high bandwidth memory controller, a direct memory access (DMA) engine, a power controller, a multiple model adaptive controller (MMAC) scheduler, and any other suitable control or interface modules.

In various embodiments, the control engine 310 may utilize the buffer 320 as needed. For example, the control engine 310 may retrieve data from the attached memory and temporarily store the data in the buffer 320. Similarly, when a data operation has been completed, the data may be temporarily stored in the buffer 320 before being output to either the attached memory or to a location external to the HBM+ cube. For example, data may be output to another HBM+ cube, the HBM+ card controller, another HBM+ card, or to a host. The buffer 320 may, for example, include an SRAM or other suitable high-speed memory. In various embodiments, the buffer 320 includes a 2 MB SRAM having a 128 KB register file, however, in other embodiments a larger or smaller SRAM may be utilized (along with an appropriate register file) depending on the application.

In various embodiments, the control engine 310 may utilize the instruction decoder/scheduler 330 for the execution of in-storage compute instructions. For example, the instruction decoder/scheduler 330 may include an instruction decoder (e.g., for one or more instruction set architectures) and a pipeline for executing the instructions. The instruction decoder/scheduler 330 may also include a scoreboard for keeping track of when instructions are completed.

In various embodiments, the controller may utilize the GEMM engine 340 for the execution of in-storage compute operations. In various embodiments, the GEMM engine 340 is configured to perform a varied of logical and arithmetic functions. For example, the GEMM engine 340 may be configured as a sparse-dense multiplexer. In some embodiments, the GEMM engine 340 may include a dense MMAC 342 and a sparse MMAC 344. The GEMM engine 340 is configured to determine when data that is being operated on is sparse or dense and send the data to the corresponding MMAC for computational operations. In various embodiments, the dense MMAC 342 may have a single instruction, multiple data (SIMD) architecture and include 64 by 64 MAC units and a fused multiply-add (FMA) engine. In various embodiments, the sparse MMAC 344 may have a zero skip multiple dataflow architecture and include 64 by 64 MAC units and a fused multiply-add (FMA) engine.

In various embodiments, the GEMM engine 340 is further configured to perform pool, activate, regularize, normalize, recurrent neural network (RNN), shuffle, and other applicable functions. Additionally, the GEMM engine 340 may be further customized with custom logic as warranted.

Figure 4:
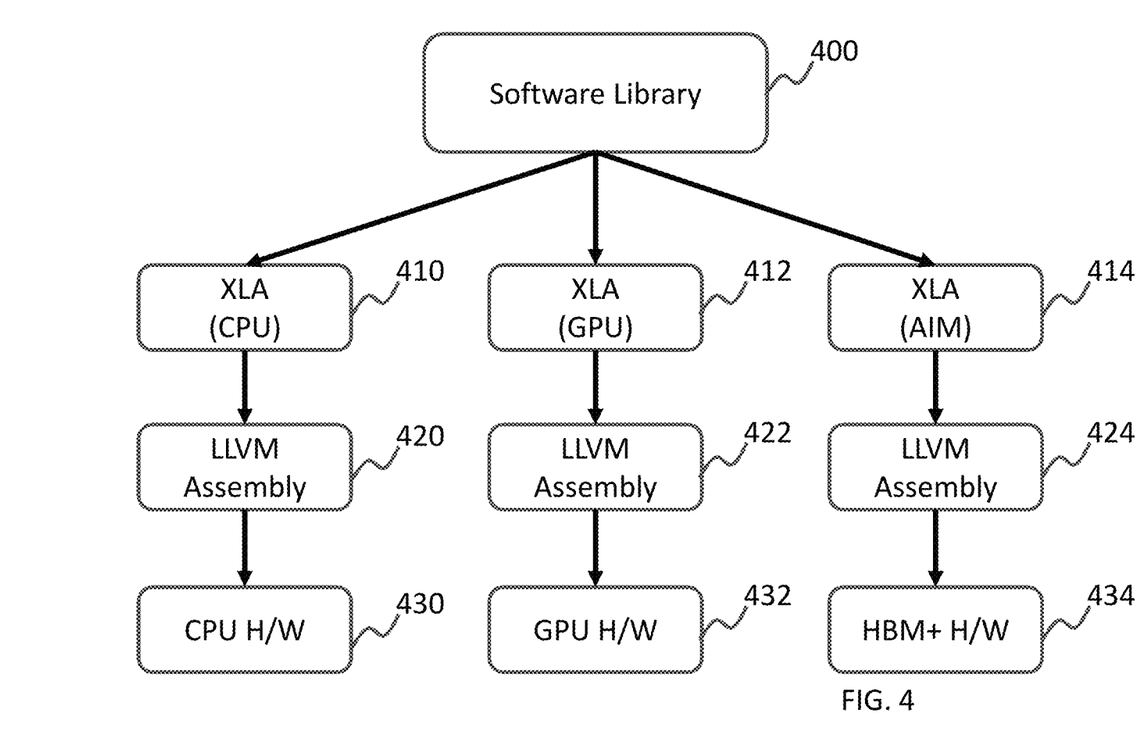
FIG. 4 depicts a HBM+ software architecture according to various embodiments.

FIG. 4 depicts a HBM+ software architecture according to various embodiments.

Referring to FIG. 4, in various embodiments, the HBM+ system includes a special purpose instruction set architecture (ISA) to instantiate and execute operations on the hardware function blocks in the logic die data and control program flow on the each HBM+ device. In various embodiments, the HBM+ ISA may utilize a combination of appropriate compilers based on the software library used. For example, a user may utilize a software library 400 such as TensorFlow, Torch, Café or other suitable software library to create software for running on a HBM+ system. The created software may then be compiled using one or more suitable complier. For example, when using TensorFlow, the HBM+ ISA may utilize accelerated linear algebra (XLA) and LLVM for compiling the software. For example, upon running the XLA compiler, the commands from the software may be divided into CPU XLA commands 410, GPU XLA commands 412, and HBM+ XLA commands 414. In various embodiments, the XLA compiler includes a simple ISA format for performing HBM+ system operations. For example, the modified ISA may include less than twenty instructions for HBM+ system operations. Some example instructions include HBM+ function calls, reads, writes, and other suitable instructions). The XLA commands 410-414 may then be provided to the LLVM compiler to be compiled into CPU machine code 420, GPU machine code 422, and HBM+ machine code 424. The machine code may then be loaded and eventually executed on a CPU 430, GPU 432, and HBM+ system 434. The compiled code may then be added to the user space library in the overall system stack and utilized by a kernel driver.

Figure 5:
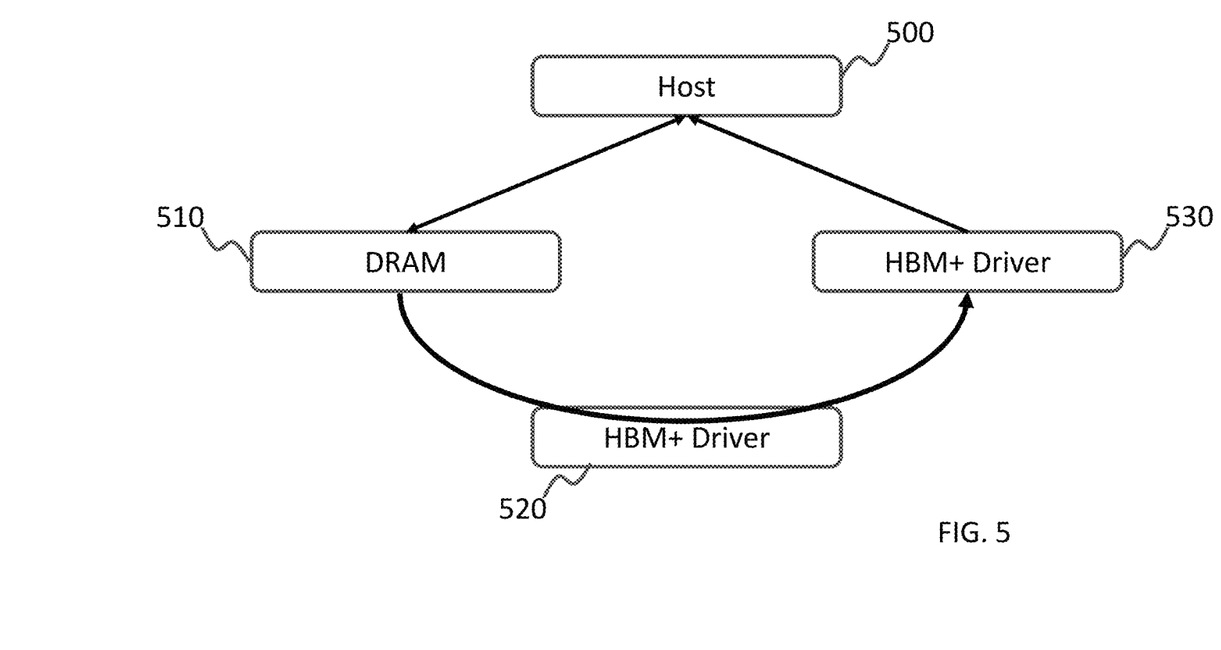
FIG. 5 depicts an example dataflow using the HBM+ software architecture according to various embodiments.

FIG. 5 depicts an example dataflow using the HBM+ software architecture according to various embodiments.

Referring to FIG. 5, in various embodiments the HBM+ system may operate according to the PCIe kernel driver. For example, a host (e.g., a CPU, a GPU, an ASIC, an FPGA, etc.) 500 may execute an instruction and read/write data to memory 510. The kernel driver, may redirect written data via a HBM+ driver 520 (e.g., based on the compiled HBM+ machine code 424) which passes the data to a HBM+ card 530. In-storage compute commands may then be directed to the HBM+ card 530 by the HBM+ driver 520 for performance. Data reads by the host 500 may then be directed by the HBM+ driver 520 to the HBM+ card 530 which then provides the read output to the host 500. Thus, in various embodiments, the HBM+ driver is a PCIe-based kernel driver that provides a HBM+ accelerator interface to the kernel and controls interrupts, direct memory access to the HBM+ card(s), manages priorities, and PCIe memory. In various embodiments, the HBM+ driver 520 may also be configured to allow for standard PCIe ioremap-based device configuration and flow control, as well as provide an interface for managing the HBM+ cards, cubes, and registers. Thus, the system supports a software API for performing scale-out acceleration in the HBM+ logic die for use with the backend software driver and library that output programming instructions based on the developed ISA.

Figure 6:
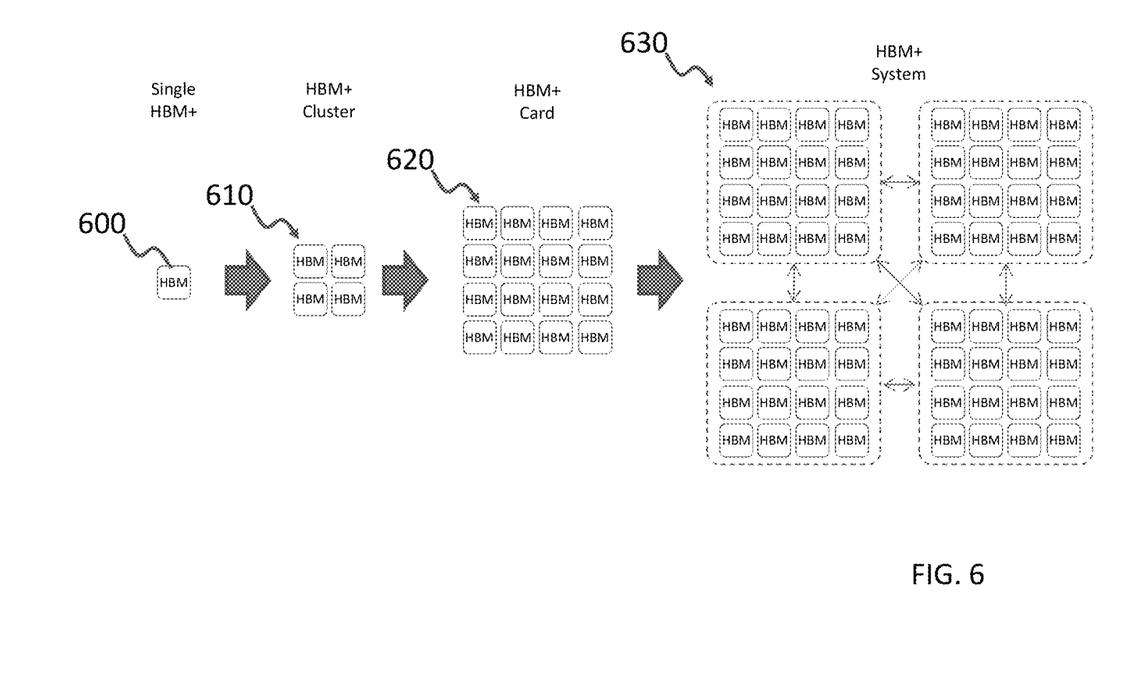
FIG. 6 depicts the scaling of HBM+ cubes to clusters to cards to the HBM+ system according to various embodiments.

FIG. 6 depicts the scaling of HBM+ cubes to clusters to cards to the HBM+ system according to various embodiments.

Referring to FIG. 6, in various embodiments single HBM+ cubes may be grouped together into clusters. Multiple clusters may then be grouped together on the same card. Multiple cards may then be connected to form a HBM+ system. For example, in various embodiments a single HBM+ cube 600 may be grouped with three additional HBM+ cubes to form a HBM+ cluster 610. In various embodiments, a card 620 may include a group of four HBM+ clusters 610. In various embodiments, two or more cards may be connected (e.g., via a direct fabric connection) to form a HBM+ system 630. For example, a HBM+ system 630 may include four HBM+ cards that are connected to each other card in the system. For example, as described above with respect to FIG. 1, each HBM+ card may include three fabric connections for connecting up to three additional HBM+ cards in a HBM+ system. However, in other embodiments, the system may include more or less HBM+ cards and each card may not be directly connected to every card in the HBM+ system. For example, cards may be daisy chained to other cards.

Figure 7:
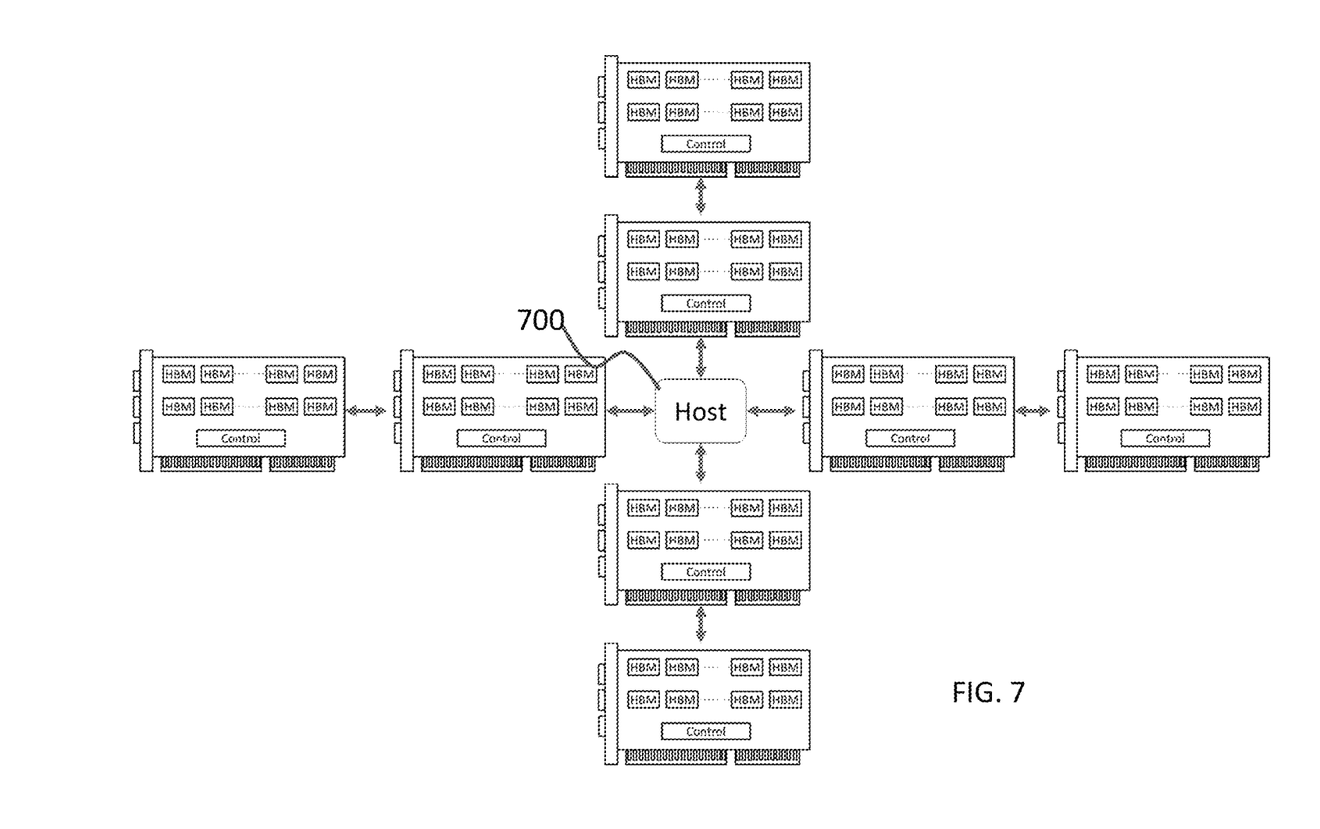
FIG. 7 and FIG. 8 depict example HBM+ system scale-out configurations according to various embodiments.
Figure 8:
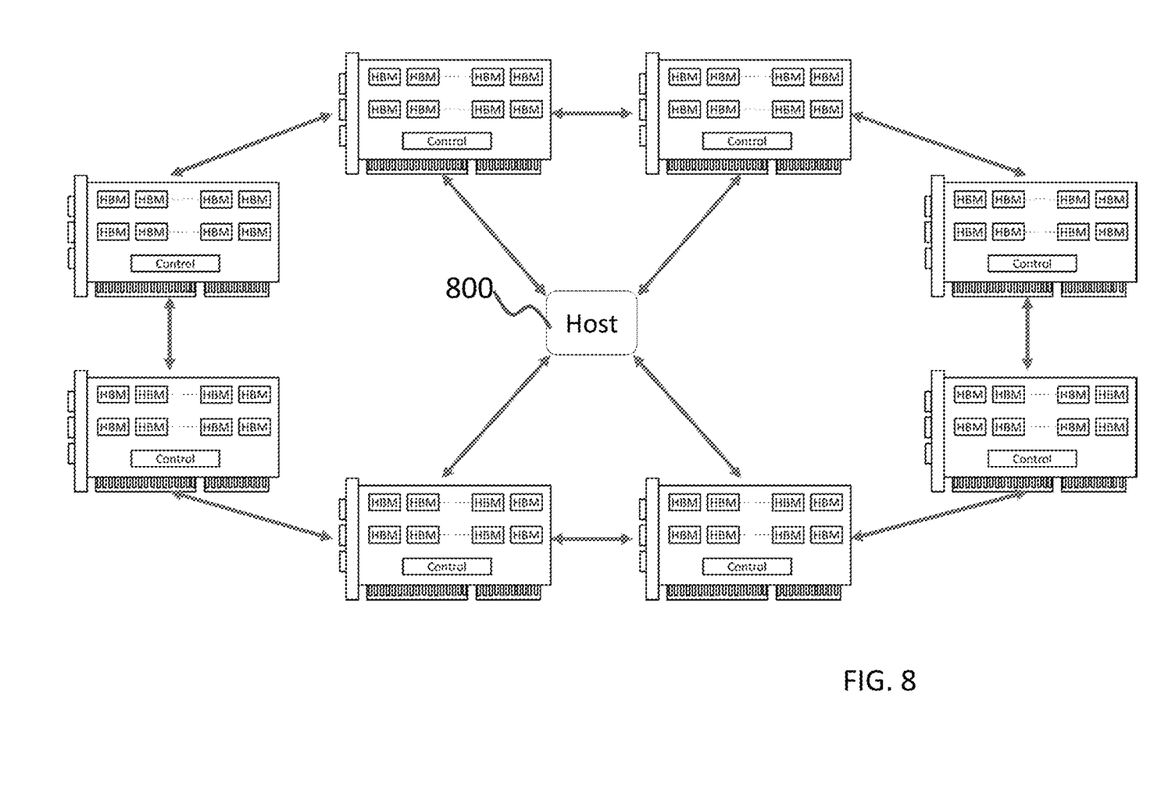

FIG. 7 and FIG. 8 depict example HBM+ system scale-out configurations according to various embodiments.

Referring to FIGS. 7 and 8, in various embodiments, a host 700/800 may have a limited number of pin connections for HBM memory. For example, a host GPU or FPGA may only have pins available for four HBM+ cards. In various embodiments, the fabric connectors of the HBM+ cards may be utilized to further scale the system to include additional cards in addition to providing direct communications paths between cards. As shown in FIG. 7, in various embodiments, four HBM+ cards may be directly connected the host 700 and each of the directly connected cards may be connected to an additional card (e.g., in a daisy chain configuration). Similarly, as shown in FIG. 8, the HBM+ cards may be in a ring configuration with four primary HBM+ cards directly connected to the host 800 and each additional card connected in the ring. Thus, the number of HBM+ cards used in the HBM+ system may be expanded beyond the pin limitations of the host 700/800.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A high bandwidth memory (HBM) system comprising:
    a first HBM+ card, wherein the first HBM+ card comprises:

a plurality of HBM+ cubes, wherein each HBM+ cube comprises a logic die and a memory die, wherein the logic die is stacked 3-dimensionally above or below the memory die;
a HBM+ card controller coupled to each of the plurality of HBM+ cubes and configured to interface with a host;
a pin connection configured to connect to the host; and
a fabric connection configured to connect the first HBM+ card to at least a second HBM+ card, wherein the second HBM+ card includes a second HBM+ cube including a second logic die and a second memory die, and a second fabric connection for connecting to the second HBM+ card to the first HBM+ card,
wherein the host provides second pin connections for connecting to certain HBM+ cards selected from the first HBM+ card and the second HBM+ card, wherein the second pin connections are fewer than a total number of HBM+ cards included in the system.

2. The HBM system of claim 1, wherein the logic die comprises an accelerator logic configured to:
receive instructions from the HBM+ card controller;
input vectors to a vector engine;
execute fused multiply-add floating point operations; and
return an output to an accumulator.

3. The HBM system of claim 1, wherein the logic die comprises an accelerator, wherein the accelerator comprises:
a control engine;
a buffer;
an instruction decoder; and
a general matrix multiply (GEMM) engine.

4. The HBM system of claim 3, wherein the control engine is configured to operate as a routing controller, a high bandwidth memory controller, a direct memory access (DMA) engine, a power controller, a multiple model adaptive controller (MMAC) scheduler.

5. The HBM system of claim 3, wherein the GEMM engine comprises:
a dense multiple model adaptive controller (MMAC);
a sparse MMAC; and
a sparse-dense multiplexer configured to route sparse data to the sparse MMAC and route dense data to dense MMAC.

6. The HBM system of claim 1, wherein the memory die comprises at least one DRAM memory block.

7. The HBM system of claim 1, wherein each of the plurality of HBM+ cubes is configured to send and receive data to another HBM+ cube in the plurality HBM+ cubes using at least one of a buffer-based or peer-to-peer communication link.

8. The system of claim 1 further comprising:
a driver coupled to the host, the first HBM+ card, and the second HBM+ card, the driver configured to receive first data read and write commands from the host, and redirect the received first data read and write commands to the first HBM+ card, the driver being further configured to receive second data read and write commands from the host, and redirect the received second data read and write commands to the second HBM+ card.

9. A high bandwidth memory (HBM) system comprising:
a first HBM+ card, wherein the first HBM+ card comprises:
a first plurality of HBM+ cubes, wherein each of the first HBM+ cubes comprises a logic die and a memory die, wherein the logic die is stacked 3-dimensionally above or below the memory die;
a first HBM+ card controller coupled to each of the first plurality of HBM+ cubes and configured to interface with a host;
a first pin connection connected to the host; and
a first fabric connection configured to connect to at least one other HBM+ card; and
a second HBM+ card, wherein the second HBM+ card comprises:
a second plurality of HBM+ cubes, wherein each of the second HBM+ cubes comprises a logic die and a memory die, wherein the logic die is stacked 3-dimensionally above or below the memory die;
a second HBM+ card controller coupled to each of the second plurality of HBM+ cubes and configured to interface with the host; and
a second fabric connection configured to connect to the first HBM+ card;
wherein the host provides second pin connections for connecting to certain HBM+ cards selected from the first HBM+ card and the second HBM+ card, wherein the second pin connections are fewer than a total number of HBM+ cards included in the system.

10. The HBM system of claim 9, wherein the first HBM+ card is connected to the second HBM+ card using the first fabric connection and the second fabric connection.

11. The HBM system of claim 9, wherein the host comprises at least one of an application-specific integrated circuit (ASIC), a field-programmable gate array (FPGA), or a graphics processing unit (GPU).

12. The HBM system of claim 9, further comprising:
a third HBM+ card having a third pin connection configured to connect to the host and a third fabric connection configured to connect to at least one HBM+ card; and
a fourth HBM+ card having a fourth pin connection configured to connect to the host and a fourth fabric connection configured to connect to at least one HBM+ card.

13. The HBM system of claim 12, wherein:
the first fabric connection is connected to the second fabric connection, the third fabric connection, and the fourth fabric connection;
the second fabric connection is connected to the first fabric connection, the third fabric connection, and the fourth fabric connection;
the third fabric connection is connected the first fabric connection, the second fabric connection, and the fourth fabric connection; and
the fourth fabric connection is connected to the first fabric connection, the second fabric connection, and the third fabric connection.

14. The HBM system of claim 12, wherein the third pin connection and the fourth pin connection are each connected to the host.

15. The HBM system of claim 14, further comprising a fifth HBM+ card having a fifth pin connection not connected to the host and a fifth fabric connection connected to at least one of the first fabric connection, the second fabric connection, the third fabric connection, or the fourth fabric connection.

16. A high bandwidth memory (HBM) system comprising:
a first HBM+ card, wherein the first HBM+ card comprises:
a plurality of HBM+ cubes, wherein each of the plurality of HBM+ cubes is configured to send and receive data to another HBM+ cube in the plurality HBM+ cubes using at least one of a buffer-based or peer-to-peer communication link and each HBM+ cube comprises a memory and an accelerator, wherein the accelerator is stacked 3-dimensionally above or below the memory, and wherein the accelerator comprises:
  a control engine;
  an SRAM;
  an instruction decoder; and
  a general matrix multiply (GEMM) engine logic die and a memory die;
a HBM+ card controller coupled to each of the plurality of HBM+ cubes and configured to interface with a host;
a pin connection configured to connect to the host; and
a fabric connection configured to connect to a second HBM+ card, wherein the second HBM+ card includes a second fabric connection for connecting to the second HBM+ card to the first HBM+ card;
wherein the host provides second pin connections for connecting to certain HBM+ cards selected from the first HBM+ card and the second HBM+ card, wherein the second pin connections are fewer than a total number of HBM+ cards included in the system.

17. The HBM system of claim 16, wherein the first HBM+ card is configured to operate in accordance with a HBM+ instruction set architecture to instantiate and execute operations on the accelerator and control a program flow and distribution between the plurality of HBM+ cubes.

18. The HBM system of claim 16, wherein the control engine is configured to operate as a routing controller, a high bandwidth memory controller, a direct memory access (DMA) engine, a power controller, a multiple model adaptive controller (MMAC) scheduler.

19. The HBM system of claim 18, wherein the GEMM engine comprises:
  a dense multiple model adaptive controller (MMAC);
  a sparse MMAC; and
  a sparse-dense multiplexer configured to route sparse data to the sparse MMAC and route dense data to dense MMAC.

* * * * *